United States Patent
Satapathy et al.

(10) Patent No.: US 7,881,447 B1
(45) Date of Patent: Feb. 1, 2011

(54) CONFERENCE CALL TEXT MESSAGING PROTOCOL USING CALLER ID SCREEN

(75) Inventors: Durga Prasad Satapathy, Olathe, KS (US); Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1596 days.

(21) Appl. No.: 11/184,201

(22) Filed: Jul. 19, 2005

(51) Int. Cl.
*H04M 3/42* (2006.01)

(52) U.S. Cl. .................................. 379/202.01; 379/158

(58) Field of Classification Search ............ 379/202.01, 379/158; 455/414.1, 566
See application file for complete search history.

(56) References Cited

U.S. PATENT DOCUMENTS

| | | | |
|---|---|---|---|
| 4,582,956 A | 4/1986 | Doughty | |
| 4,953,159 A | 8/1990 | Hayden et al. | |
| 5,327,492 A * | 7/1994 | Parola | 379/361 |
| 5,475,747 A | 12/1995 | Bales et al. | |
| 5,703,936 A | 12/1997 | Tsuchida et al. | |
| 5,864,612 A * | 1/1999 | Strauss et al. | 379/142.03 |
| 6,404,868 B1 | 6/2002 | Beamish et al. | |
| 6,628,767 B1 | 9/2003 | Wellner et al. | |
| 6,754,322 B1 | 6/2004 | Bushnell | |
| 6,980,993 B2 * | 12/2005 | Horvitz et al. | 707/102 |
| 7,010,110 B2 * | 3/2006 | Jorasch et al. | 379/207.04 |
| 2002/0136382 A1 * | 9/2002 | Cohen et al. | 379/202.01 |
| 2003/0081751 A1 | 5/2003 | Berstis | |
| 2004/0028199 A1 | 2/2004 | Carlson | |
| 2004/0132468 A1 * | 7/2004 | Rogalski et al. | 455/466 |
| 2004/0170264 A1 | 9/2004 | Benco et al. | |
| 2004/0203652 A1 * | 10/2004 | Yan | 455/414.1 |
| 2004/0209605 A1 * | 10/2004 | Urban et al. | 455/415 |
| 2005/0034079 A1 * | 2/2005 | Gunasekar et al. | 715/753 |
| 2005/0094792 A1 | 5/2005 | Berthoud et al. | |
| 2005/0163065 A1 * | 7/2005 | Yule | 370/315 |
| 2005/0213739 A1 * | 9/2005 | Rodman et al. | 379/202.01 |
| 2005/0228754 A1 * | 10/2005 | Pezzaniti et al. | 705/64 |
| 2005/0238156 A1 * | 10/2005 | Turner | 379/202.01 |
| 2005/0249216 A1 * | 11/2005 | Jones | 370/392 |
| 2006/0003761 A1 * | 1/2006 | Fry et al. | 455/426.1 |
| 2006/0029195 A1 * | 2/2006 | Mullis et al. | 379/88.17 |
| 2006/0072548 A1 * | 4/2006 | Mundra et al. | 370/352 |

\* cited by examiner

*Primary Examiner*—William J Deane

(57) ABSTRACT

A voice conference bridge provides respective voice connections to a call coordinator and a plurality of call participants. A message server is coupled to the voice conference bridge for receiving DTMF tone messages from the call coordinator and the call participants and for sending data messages in a caller ID format to the call coordinator and the call participants via the voice conference bridge. The message server interacts with the call participants using a participant-initiated request channel and a server-initiated broadcast channel. A particular call participant invokes the request channel by including a predetermined tone command in a respective DTMF tone message. The particular call participant forwards a message content to the message server by including predetermined tone data in the respective DTMF tone message. The message server forwards the message content to other call participants via the broadcast channel according to an approval granted to the particular call participant.

30 Claims, 4 Drawing Sheets

US 7,881,447 B1

CONFERENCE CALL TEXT MESSAGING PROTOCOL USING CALLER ID SCREEN

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to multiparty conference calls in a telecommunications network, and, more specifically, to text messaging between participants to a conference call using only the voice connections to the conference bridge without requiring a separate data network connection.

Audio teleconferencing has become an important means of collaboration among groups of people. Allowing many call participants to communicate simultaneously by voice using a telephone network avoids or reduces the need for travel to attend face to face meetings in many circumstances. An audio conference call typically utilizes a conference bridge for tying together all the call participants. The conference call is typically set up and hosted by one particular call participant often referred to as the call coordinator. The call coordinator is responsible for arranging access to a conference bridge and providing necessary information to each of the participants in order to access the conference call.

Once a conference call is in progress, participants may leave the call (e.g., by hanging up) or may join the ongoing call. It is desirable for all participants to be aware of the identities of all other participants currently in a conference call, but it is undesirable to cause disruptions or interruptions to an ongoing discussion in order to orally announce the joining of a new party. U.S. Patent Application Publication 2003/0081751A1 in the name of Berstis proposes a data communication system in association with a conference call wherein participant information and the identity of a speaker (i.e., represented by the telephone number from which they called into the conference call) are transmitted to a text display for each call participant. All information is automatically generated and automatically sent to each participant.

Some information that a call participant may desire to convey to others during a conference call may be more effectively shared using visual text. For example, a participant may desire to inform all other call participants of contact information (such as an email address or telephone number) or other information such as a URL for a website. Speaking this information to be recorded individually by the other participants is subject to errors and is an inefficient use of the participants' time. Such information can be more effectively shared by sending a text-based message to the other participants, but this has caused the sharing of the information to be deferred, e.g., by subsequently sending out an email or other type of message including the information. A short text messaging service has been provided over cellular telephone services which can easily share this type of text information, but these messages have not been integrated with simultaneous voice conferencing and have not been integrated with traditional landline phone services.

Digital communication networks, such as ISDN and VoIP systems, are known which use a data channel to supplement voice conferences, provided that a data terminal or a personal computer is available to the call participant. Therefore, sharing of text messages simultaneously with a voice conference has required specialized equipment.

A digital interface or a versatile display suitable for text messaging are typically unavailable in conjunction with analog customer premises equipment (CPE) connected to a land line in a plain old telephone service (POTS). One type of display which is frequently available, however, is the caller ID screen. U.S. Pat. No. 6,404,868 issued to Beamish et al. has suggested using caller ID devices to display information exchanged on a peer to peer basis. However, message initiation and exchange requires generation of an FSK signal for every transmission. Therefore, real-time text messaging wherein a message is to be generated using a CPE device (i.e., telephone) without special equipment is not possible in Beamish et al.

There is a need for a flexible text messaging system usable in connection with an analog voice conference in an analog voice telephone network without special equipment. No existing or proposed system has allowed a conference call coordinator to control the flow of supplemental information during a call or has permitted participants to exchange other kinds of text-based information.

SUMMARY OF THE INVENTION

In one aspect of the invention, a conference call text messaging system comprises a voice conference bridge and a message server. The voice conference bridge provides respective voice connections to a call coordinator and a plurality of call participants. The message server is coupled to the voice conference bridge for receiving DTMF tone messages from the call coordinator and the call participants and for sending data messages in a caller ID format to the call coordinator and the call participants via the voice conference bridge. The message server interacts with the call participants using a participant-initiated request channel and a server-initiated broadcast channel. A particular call participant invokes the request channel by including a predetermined tone command in a respective DTMF tone message. The particular call participant forwards a message content to the message server by including predetermined tone data in the respective DTMF tone message. The message server forwards the message content to other call participants via the broadcast channel according to an approval granted to the particular call participant.

DETAILED DESCRIPTION OF PREFERRED EMBODIMENTS

Figure 1:
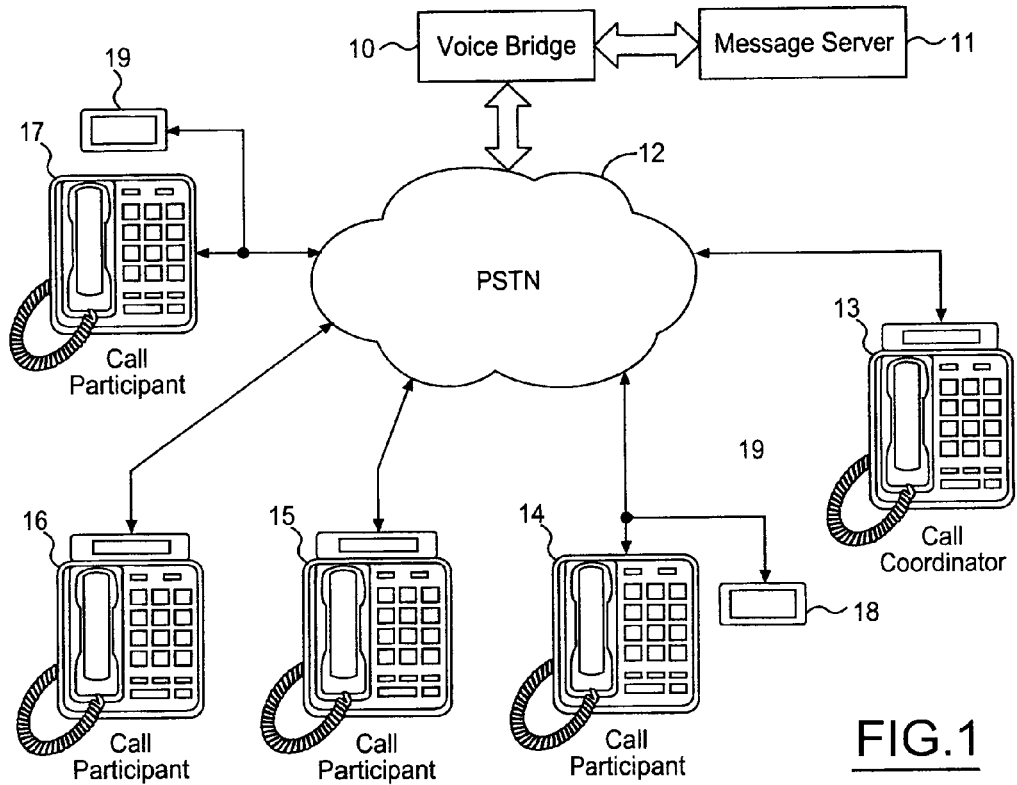
FIG. 1 is a network diagram showing an architecture supporting a conference call of the present invention.

Referring to FIG. 1, a voice bridge 10 is coupled to a message server 11 and a public switched telephone network (PSTN) 12. Voice bridge 10 and message server 11 may be separate devices or may be integrated into a single device.

Voice bridge 10 implements a conventional audio conference call for tying together a plurality of call participants from respective CPE terminals 13-17. One participant on a conference call is a call coordinator as shown using CPE device 13. Each participant has a caller ID display available for showing text messages during a conference call. The caller ID display may be integrated with a CPE device as shown at 13 or may be a separate caller ID unit connected to the respective phone line as shown at 18 and 19. Each CPE device preferably includes a conventional DTMF touch tone keypad used for sending information to message server 11 and to other call participants. Message server 11 preferably sends text information to the caller ID displays of call participants using conventional frequency shift keying (FSK) modulation as is already used to display incoming caller information in the conventional caller ID system. Alternatively, additional decoding circuitry can be provided at each CPE device or caller ID unit to decode text messages transmitted using a different modulation scheme such as using DTMF tones directly.

Figure 2:
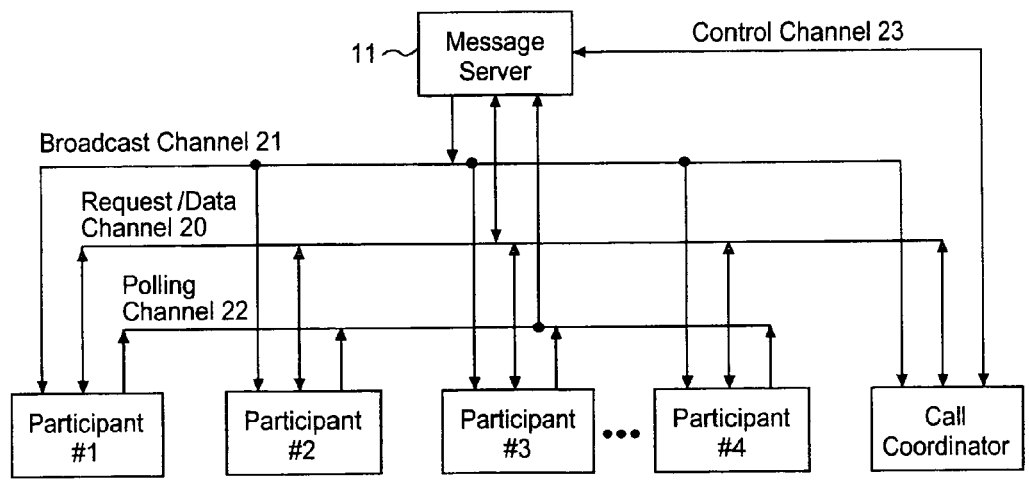
FIG. 2 is a block diagram showing virtual channels according to a message protocol of the present invention.

The present invention utilizes particular virtual channels for interconnecting message server 11 with the various call participants and the call coordinator as shown in FIG. 2. Thus, participants #1-#4 and the call coordinator are coupled to message server 11 by a request/data channel 20, a broadcast channel 21, and a polling channel 22. In addition, the call coordinator is coupled to message server 11 by a control channel 23. All signaling from a call participant or the call coordinator to message server 11 is preferably conducted over the voice channel of the conference call using DTMF tones. All text transmission from message server 11 to the call participants and call coordinator are preferably comprised of FSK transmissions over the voice channel. The virtual channels shown in FIG. 2 provide a protocol under which messages are exchanged.

In order to ensure that use of the text messaging function is consistent with the objectives of a particular conference call, each of the channels are under the control of the call coordinator using control channel 23. Request/data channel 20 is available to call participants in order to send text message content to be shared with the call coordinator and potentially with other call participants. By default, when a call participant generates a DTMF tone message including predetermined tone commands in order to transmit message content to message server 11, the message content is first forwarded by message server 11 to the call coordinator for review. Message server 11 may then forward the message content to other call participants via broadcast channel 21 according to an approval granted to the particular call participant. Approval may be granted by the call coordinator over control channel 23 after reviewing particular message content (e.g., by generating an approval signal using the coordinator's touch tone keypad) or message server 11 may be configured in advance to grant general access to the broadcast channel to the particular call participant submitting the message content.

The recipients of a text broadcast may include all other call participants or may include a selected subset of participants. The subset may be determined by a particular configuration of message server 11 or may be specified by the message sender or by the call coordinator using the predetermined tone commands entered by the call participant or call coordinator, respectively.

Figure 3:
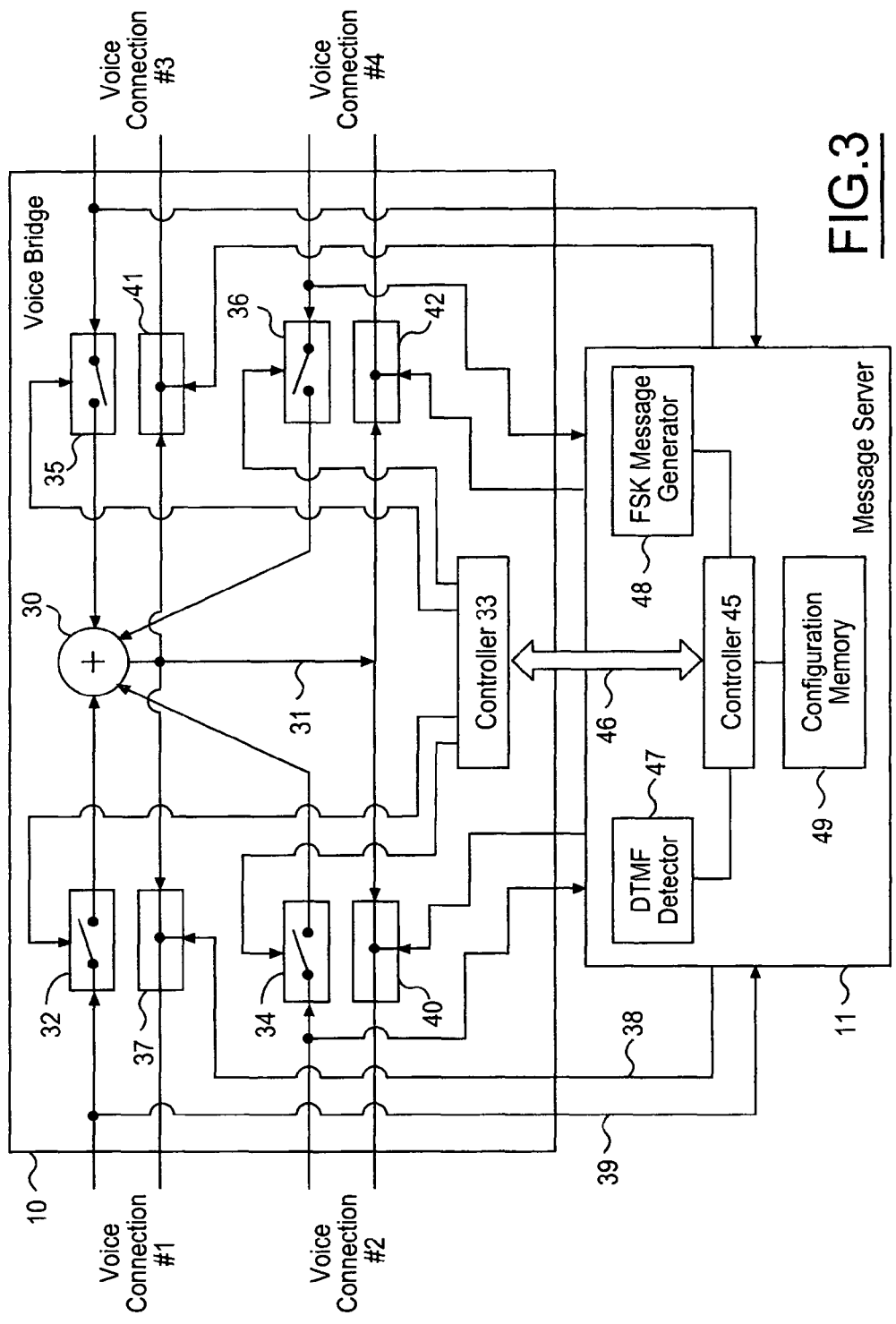
FIG. 3 is a block diagram showing a conference bridge and message server of the invention in greater detail.

FIG. 3 shows voice bridge 10 and message server 11 in greater detail. Voice bridge 10 includes a summing junction 30 receiving audio signals from a plurality of voice connections #1-#4 to provide a summed output 31 back to the voice connections. An incoming voice line of voice connection #1 is connected to a blocking switch 32 under control of a controller 33 for selectively blocking (i.e., muting) audio from voice connection #1 from the summed bridge output 31. DTMF tones generated over voice connection #1 are prevented from being heard by other call participants when blocking switch 32 is opened but the DTMF signals reach message server 11 via a line 39 connected ahead of blocking switch 32. Likewise, voice connections #2-#4 include blocking switches 34-36 under control of controller 33.

In the audio return line for voice connection #1, a coupler 37 has inputs connected to bridge output 31 and to an audio output 38 of message server 11. Thus, message server 11 can send text messages specifically to a desired call participant using voice connection #1. Voice connections #2-#4 are associated with couplers 40-42 providing the same function. Message server 11 has separate audio outputs for carrying a respective FSK signal to each voice connection. Alternatively, a single audio line from message server 11 could be switched to the appropriate voice connections by a multiplex switch in voice bridge 10. In either embodiment, message server 11 and voice conference bridge 10 cooperatively determine one or more respective voice connections for receiving a particular data message.

Message server 11 includes a controller 45 coupled to controller 33 by a bus 46. Message server 11 includes a DTMF detector 47 (which may be either a shared detector or separate detectors) and one or more FSK message generators 48 connected to controller 45. A configuration memory 49 is connected to controller 45 for storing set-up information for controlling call participants' usage of the messaging channels and any automatic approvals or access rights.

When DTMF detector 47 senses the presence of a DTMF tone on a particular voice connection, controller 45 notifies controller 33 in order to open the corresponding blocking switch so that an ongoing discussion on the audio voice conference is not further disrupted by the tones from a call participant who is sending a DTMF tone message to message server 11.

Figure 4:
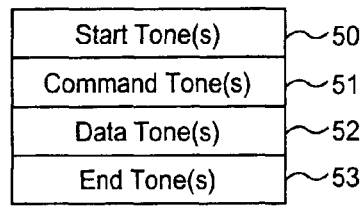
FIG. 4 illustrates a preferred format for a DTMF tone message.

FIG. 4 shows a preferred message format for sending DTMF tone messages to the message server. A tone message intended for the message server begins with predetermined start tones 50 in order activate the DTMF detector connected to the corresponding voice connection. The start tones are unique tones (e.g., 8) for identifying the text messaging system and do not conflict with any other possible tone-controlled functions within the telephone conference system. Once the DTMF detector is activated, further tones may be interpreted as command tones 51. Of the several virtual channels available to the user, command tones 51** may identify the particular message channel being accessed. For example, command tones of *3 entered from the telephone keypad may indicate that the DTMF tone message is intended for the request/data channel (separate commands may indicate a message intended for just the call coordinator, a message intended for broadcast to all participants, or a message intended for broadcast to a subset of participants) while a command tone of *9 entered by the call coordinator may indicate the control channel. Next, data tones 52 are provided in the DTMF tone message in order to convey the message content. An end tone or tones 53 signal the end of a message and inform the corresponding DTMF detector and the message server that the message has ended.

Figure 5:
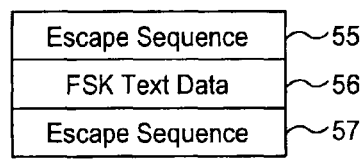
FIG. 5 illustrates a preferred format for a data message from the message server.

A transmission format for sending message content as text from message server 11 to the caller ID screens of corresponding call participants is shown in FIG. 5. It is necessary to alert a caller ID device to the presence of incoming text information for decoding. In normal caller ID operation, the caller ID unit detects the occurrence of a ring signal and then captures FSK data sent between the first and second rings for display. Since it is not possible to generate a ring in order to initiate FSK data decoding during a conference call, the present invention slightly modifies the caller ID function in order to detect a special escape sequence which may be generated by the message server or voice bridge and which is unique from all other signals occurring in the telecommunication system. For example, an escape sequence comprising a frequency combination of the fundamental tone frequencies used to generate DTMF tones could be used (e.g., three simultaneous fundamental tones). Thus, the signals from the message server and/or voice bridge include an escape sequence 55, followed by FSK text data 56, and followed by a repeat of the escape sequence 57 as shown in FIG. 5. FSK text data 56 may include a number of characters greater than the characters available on a particular display (e.g., may be any arbitrary length). In that instance, text message content may be scrolled through the display. Escape sequence 57 signals the caller ID unit to stop listening for FSK text data.

Figure 6:
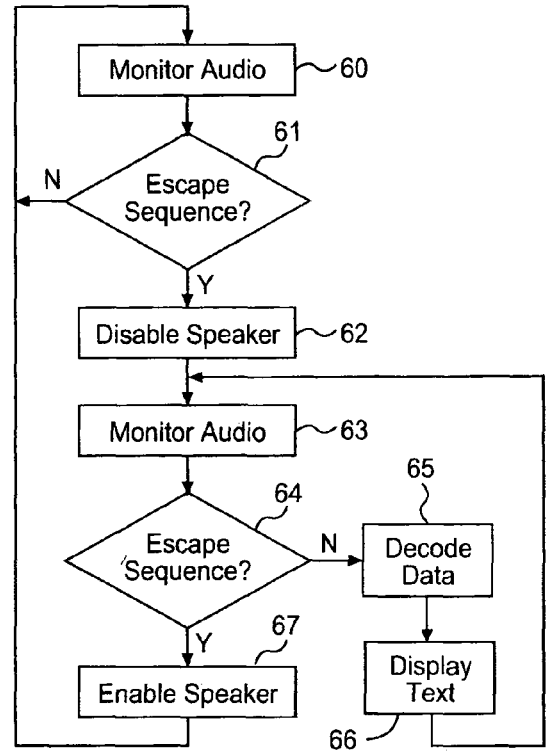
FIG. 6 is a flowchart showing one preferred method for receiving a data message.

Operation of the CPE caller ID unit for receiving and displaying text messages is shown in FIG. 6. In step 60, the incoming communication line is monitored for the presence of audio command tones. In step 61, a check is made to determine whether audio tones corresponding to the predetermined escape sequence are present. If not, the method continues to monitor audio in steps 60 and 61. If an escape sequence is detected, then the audio speaker (e.g., a loudspeaker in a handset or an active hands-free speaker) is optionally disabled in step 62 so that transmission of the FSK or other tone data is not heard by the call participant. The incoming telecommunications line is further monitored for audio tones in step 63 and a further check is made for the occurrence of the escape sequence in step 64. If the incoming audio does not include the escape sequence, then FSK data is decoded in step 65 and the corresponding text is displayed in step 66. Thereafter, the method continues to monitor audio in steps 63 and 64. When an escape sequence is detected in step 64, then the speaker of the CPE device is re-enabled in step 67 and a return is made to step 60.

Figure 7:
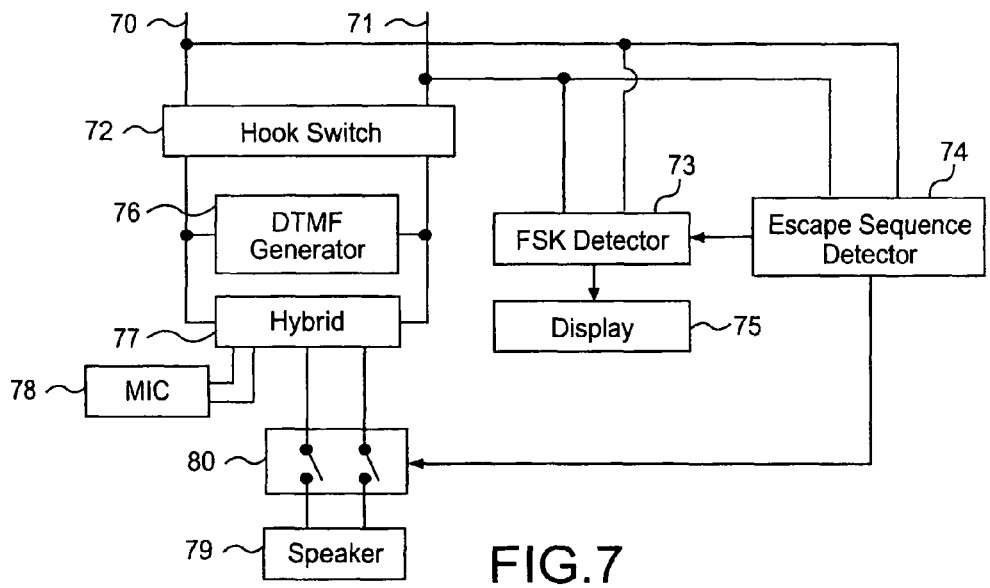
FIG. 7 is a block diagram showing customer premises equipment for sending DTMF tone messages and receiving data messages for displaying text messages on a caller ID display.

A CPE device used in a preferred embodiment of the present invention is shown in FIG. 7. Incoming telephone lines 70 and 71 are connected to a hook switch 72, an FSK detector 73, and an escape sequence detector 74. FSK detector 73 is connected to a caller ID display 75, such as an LCD display. FSK detector 73 may typically include a ring detector for activating the FSK detection function for normal caller ID. Escape sequence detector 74 is provided for sensing the occurrence of an escape sequence and activating FSK detector 73 in order to decode text data received over lines 70 and 71 after the occurrence of the escape sequence. Escape sequence detector 74 may include an off-hook detector so that the escape sequence is only checked for when the CPE device is in use.

When hook switch 72 is off hook, then lines 70 and 71 are connected to a DTMF generator 76 and a conventional hybrid circuit 77. Hybrid circuit 77 is connected to a microphone 78 and to a speaker 79 through a mute switch 80 which is controlled by escape sequence detector 74.

Figure 8:
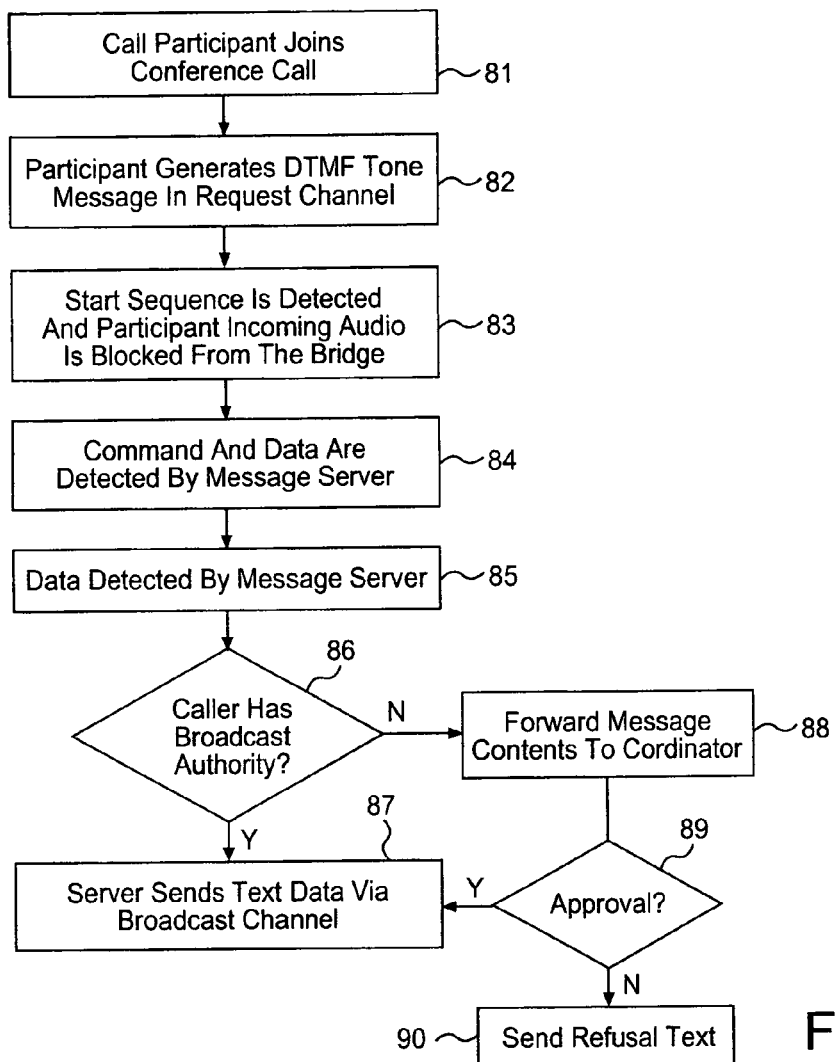
FIG. 8 is a flowchart showing one example of text messaging using a request/data channel and a broadcast channel.

FIG. 8 is a flowchart showing one particular use of the text messaging system to announce the arrival of call participants. Thus, in step 81 a call participant joins an ongoing conference call. If the new call participant desires to announce their presence to the call coordinator and/or other call participants, they generate a DTMF tone message in the request/data channel in step 82. The DTMF tone message begins with a start sequence. The start sequence is detected by the audio bridge and/or message server in step 83 and incoming audio over the voice channel from the call participant initiating the DTMF tone message is blocked from the bridge in step 83. Command and data tones are detected by the message server in step 84. Text data within the tone message is decoded by the message server in step 84. A suitable system for manually entering text data using DTMF tones may be used, as is known in the art. A DTMF keyboard could also be used.

A check is made in step 86 to determine whether the call participant has broadcast authority for automatically forwarding text information to other call participants. If so, then the message server sends the received text data via the broadcast channel to either all call participants or a subset of selected call participants specified by the call participant. If the call participant does not have broadcast to authority, then the message contents are forwarded to the call coordinator in step 88. Based on reviewing the message content, the coordinator indicates over the control channel whether broadcasting of the message content is approved. The message server checks for an approval in step 89. If approval is received, then the server sends the text data via the broadcast channel in step 87. Otherwise, a refusal text may be sent to the requesting call participant informing them that the text will not be forwarded to other participants.

Figure 9:
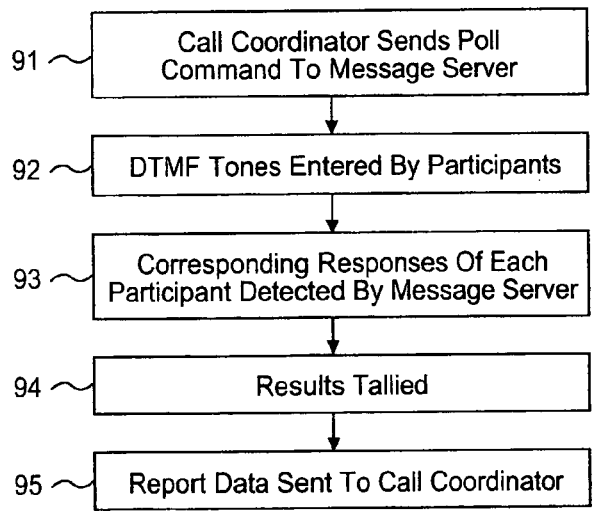
FIG. 9 is a flowchart showing an example of text messaging using a polling channel.

The use of the invention in another situation is shown in FIG. 9. Polling may preferably be used to solicit comments or decisions from call participants in an efficient and unobtrusive way. Thus, the polling channel may be opened by the call coordinator to allow each call participant to vote or otherwise make some sort of selection using appropriate key presses on their DTMF keypad. Referring to FIG. 9, the call coordinator sends a poll command to the message server to activate the polling channel in step 91. In conjunction with the command to the message server, the call coordinator may preferably discuss the poll being taken and explain to the call participants the responses that may be entered. For example, the call participants may be asked to vote on a particular question by entering a "1" on the keypad for a yes vote and entering a "2" for a no vote. Based on a desired selection, the call participants enter their desired DTMF tones in step 92. The corresponding responses of each participant are detected by the message server in step 93 and the results are tallied by the message server in step 94. Based on the tallied results, a report is sent to the call coordinator in step 95. The report may preferably comprise a text message from the message server to the call coordinator. The call coordinator may also indicate to the message server over the control channel that the tallied results are to be forwarded to all the call participants over the broadcast channel.

To avoid delays and message server port availability limitations, the message server may send polling requests staggered in time to each of the participants with instructions on the polling format.

What is claimed is:

1. A conference call text messaging system comprising:
 a voice conference bridge providing respective voice connections to a call coordinator and a plurality of call participants; and
 a message server coupled to said voice conference bridge for receiving DTMF tone messages from said call coordinator and said call participants and for sending data messages in a caller ID format to said call coordinator and said call participants via said voice conference bridge, wherein said message server interacts with said call participants using a participant-initiated request channel and a server-initiated broadcast channel, wherein a particular call participant invokes said request channel by including a predetermined tone command in a respective DTMF tone message, wherein said particular call participant forwards a message content to said message server by including predetermined tone data in said respective DTMF tone message, and wherein said message server forwards said message content to other call participants via said broadcast channel according to an approval granted to said particular call participant.

2. The system of claim 1 wherein said message server forwards said message content to said call coordinator to solicit said approval from said call coordinator via a control channel.

3. The system of claim 1 wherein said call coordinator specifies said approval in advance via a control channel based on granting broadcast authority to said particular call participant.

4. The system of claim 1 wherein said message server forwards said message content to all other call participants after said approval.

5. The system of claim 1 wherein said message server forwards said message content to a selected other call participant or said call coordinator as identified by said particular call participant.

6. The system of claim 1 wherein said message server and said voice conference bridge cooperatively determine one or more respective voice connections for receiving a particular data message.

7. The system of claim 1 wherein said DTMF tone messages are each comprised of a start section for indicating the beginning of a respective DTMF tone message and a data section for encoding said message content.

8. The system of claim 7 wherein said DTMF tone messages are each further comprised of a command section for indicating a desired handling of said message content.

9. The system of claim 1 wherein said message server further interacts with said call participants using a coordinator-initiated polling channel allowing said call participants to submit a selected response via said DTMF tone messages, wherein said message server aggregates said selected responses from said call participants and provides a corresponding report to said call coordinator.

10. The system of claim 1 wherein said voice conference bridge blocks a DTMF tone message being received from said particular call participant from contributing to an audio output provided to said respective voice connections for said other call participants and said call coordinator.

11. The system of claim 10 wherein said message server provides a blocking control signal to said voice conference bridge during a respective DTMF tone message identifying a voice connection carrying a DTMF tone message.

12. The system of claim 1 wherein said data messages in said caller ID format are transmitted using frequency shift keying.

13. The system of claim 12 wherein each of said data messages is preceded by an escape sequence to signal the beginning of said frequency shift keying transmission.

14. The system of claim 13 wherein each of said data messages is followed by said escape sequence to signal the termination of said frequency shift keying transmission.

15. A method for sharing test messages during a conference call carried by a voice conference bridge to a call coordinator and a plurality of call participants, said method comprising the steps of:
 receiving DTMF tone messages from said call coordinator and said call participants at a message server coupled to said voice conference bridge; and
 sending data messages in a caller ID format to said call coordinator and to said call participants via said voice conference bridge;
 wherein said DTMF tone messages and said data messages are exchanged according to a participant-initiated request channel and a server-initiated broadcast channel, wherein a particular call participant invokes said request channel by including a predetermined tone command in a respective DTMF tone message, wherein said particular call participant forwards a message content to said message server by including predetermined tone data in said respective DTMF tone message, and wherein said message server forwards said message content to other call participants via said broadcast channel according to an approval granted to said particular call participant.

16. The method of claim 15 wherein said message server forwards said message content to said call coordinator to solicit said approval from said call coordinator via a control channel.

17. The method of claim 15 wherein said call coordinator specifies said approval in advance via a control channel based on granting broadcast authority to said particular call participant.

18. The method of claim 15 wherein said message server forwards said message content to all other call participants after said approval.

19. The method of claim 15 wherein said message server forwards said message content to a selected other call participant or said call coordinator as identified by said particular call participant.

20. The method of claim 15 wherein said message server provides a forwarding control signal to said voice conference bridge for determining one or more respective voice connections for receiving a particular data message.

21. The method of claim 15 wherein said DTMF tone messages are each comprised of a start section for indicating the beginning of a respective DTMF tone message and a data section for encoding said message content.

22. The method of claim 21 wherein said DTMF tone messages are each further comprised of a command section for indicating a desired handling of said message content.

23. The method of claim 15 wherein said DTMF tone messages and said data messages are further exchanged according to a coordinator-initiated polling channel allowing said call participants to submit a selected response via said DTMF tone messages, wherein said message server aggregates said selected responses from said call participants and provides a corresponding report to said call coordinator.

24. The method of claim 15 wherein said voice conference bridge blocks a DTMF tone message being received from said particular call participant from contributing to an audio output provided to said respective voice connections for said other call participants and said call coordinator.

25. The method of claim 24 wherein said message server provides a blocking control signal to said voice conference bridge during a respective DTMF tone message identifying a voice connection carrying a DTMF tone message.

26. The method of claim 15 wherein said data messages in said caller ID format are transmitted using frequency shift keying.

27. The method of claim 26 wherein each of said data messages is preceded by an escape sequence to signal the beginning of said frequency shift keying transmission.

28. The method of claim 27 wherein each of said data messages is followed by said escape sequence to signal the termination of said frequency shift keying transmission.

29. A conference call text messaging system comprising:
  a voice conference bridge providing respective voice connections to a call coordinator and a plurality of call participants; and
  a message server coupled to said voice conference bridge for receiving DTMF tone messages from said call coordinator and said call participants and for sending data messages in a caller ID format to said call coordinator and said call participants via said voice conference bridge, wherein said message server interacts with said call coordinator using a control channel allowing said call coordinator to activate a polling channel, and wherein said message server interacts with said call participants using said polling channel allowing each respective call participant to submit a selected response via said DTMF tone messages, wherein said message server aggregates said selected responses from said call participants, and wherein said message server provides a corresponding report to said call coordinator.

30. The system of claim 29 wherein said message server forwards said report to said call participants.

* * * * *